United States Patent [19]

Raczkowski et al.

[11] Patent Number: 4,805,550
[45] Date of Patent: Feb. 21, 1989

[54] SAFETY TRIANGLE

[76] Inventors: Ron Raczkowski; Rich Wojcik; Thomas Fraszczynski, all c/o Sparklite Inc. 3725 W. Diversey Ave., Chicago, Ill. 60647

[21] Appl. No.: 426,602

[22] Filed: Sep. 29, 1982

[51] Int. Cl.[4] .............................................. E01F 9/10
[52] U.S. Cl. .............................. 116/63 T; 116/63 D; 40/602; 40/612; 350/97
[58] Field of Search ................ 116/63 C, 63 P, 63 R, 116/63 T; 40/606, 610, 612, 539, 602; 350/97; 404/6, 9-11; 248/DIG. 10, 364, 472

[56] References Cited

U.S. PATENT DOCUMENTS

| 3,766,881 | 10/1973 | Ward | 350/97 |
| 3,773,012 | 11/1973 | Lindner et al. | 350/97 |
| 3,822,668 | 7/1974 | Schradieck et al. | 116/63 T |
| 3,934,541 | 1/1976 | May et al. | 116/63 T |
| 3,934,542 | 1/1976 | May et al. | 116/63 T |
| 4,177,749 | 12/1979 | Lindner | 116/63 T |

FOREIGN PATENT DOCUMENTS 2241660 3/1975 France ............................. 116/63 T Primary Examiner—William A. Cuchlinski, Jr.
Assistant Examiner—W. Morris Worth
Attorney, Agent, or Firm—Paul H. Gallagher

[57] ABSTRACT

The triangle structure includes a base and the three sides of the triangle proper. The sides (blades) are detachably fitted together by pin/notch connections, being movable to a folded position and a set-up position and the same pin-notch connections are utilized in both positions. The bottom blade is mounted on the base by a swivel connection, enabling the base to be swung to a transverse position for use in setting up the device, and it enables separation of the base when swung to an oppsoite position. The blades are shaped to deflect a portion of the wind onto and against the lee side thereof, to partially counterbalance the wind, for stability.

13 Claims, 3 Drawing Sheets

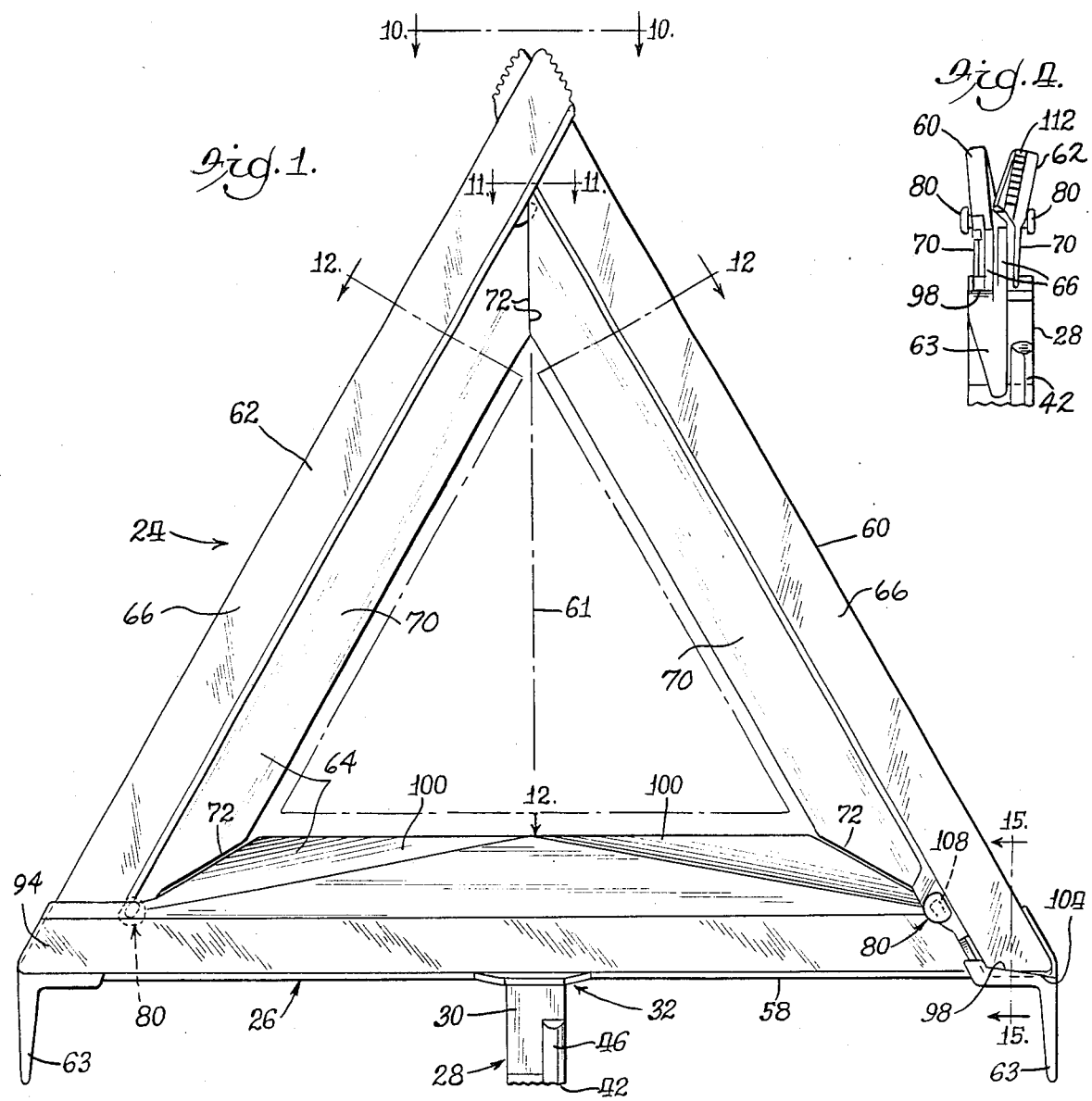
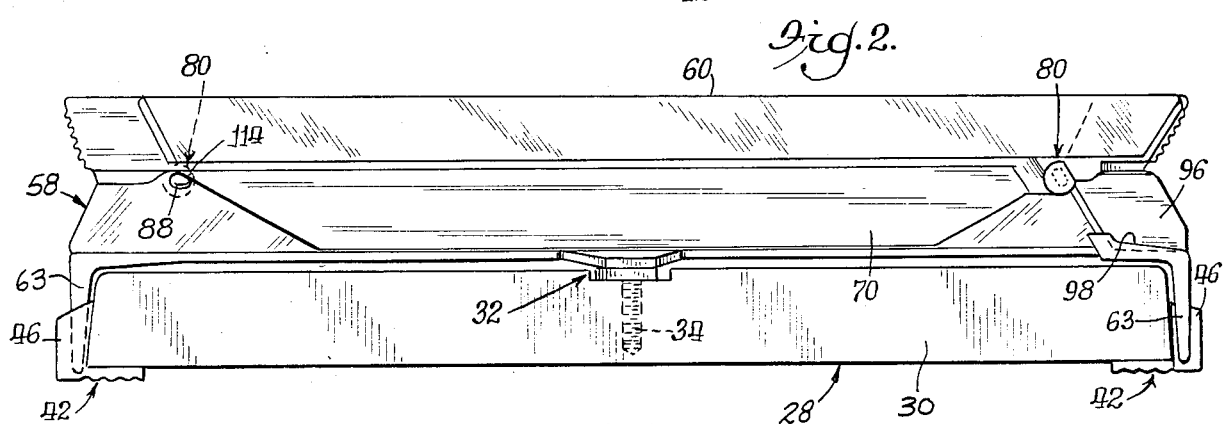

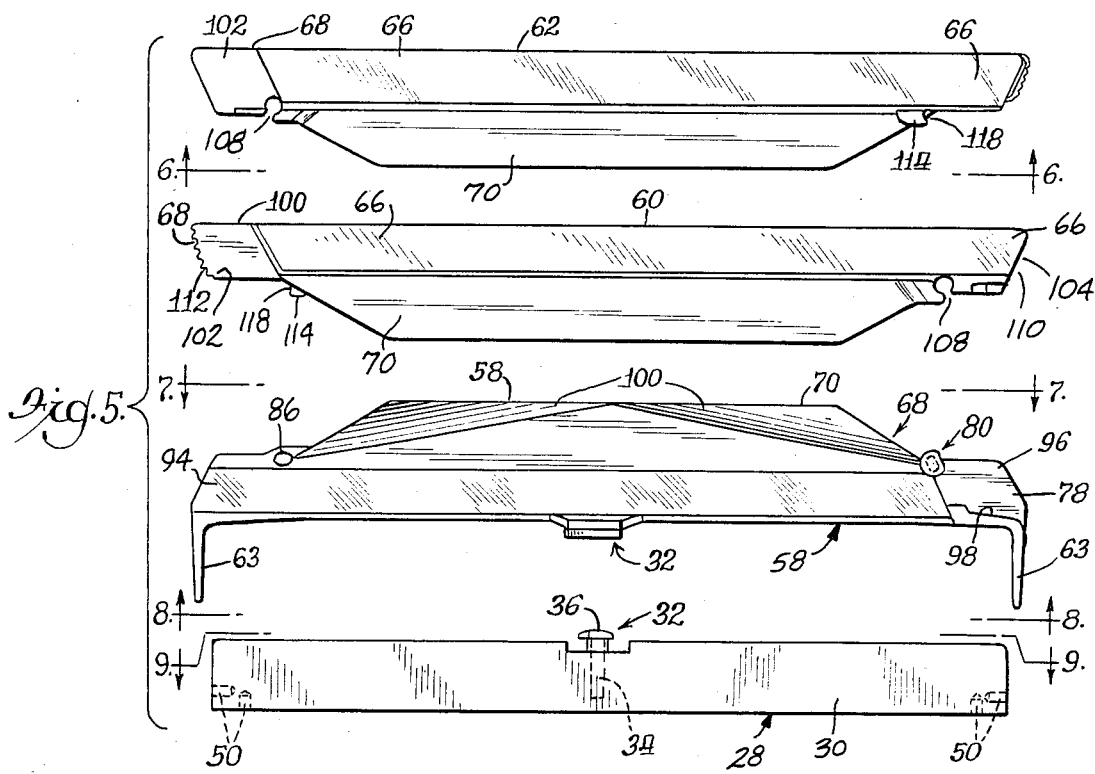
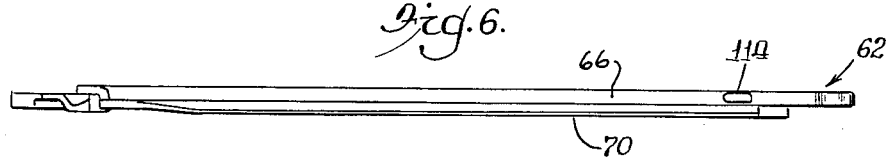
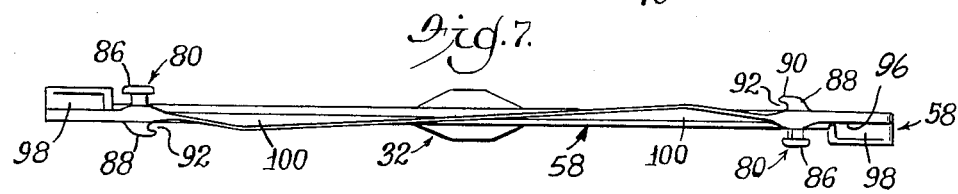
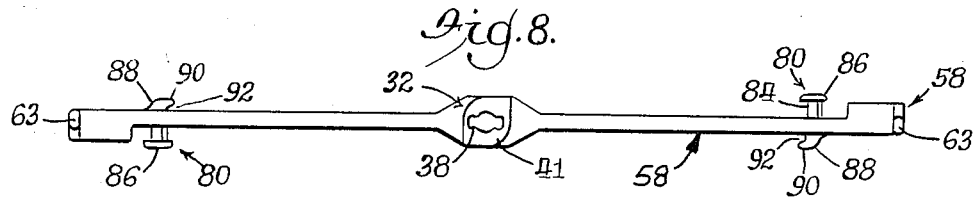
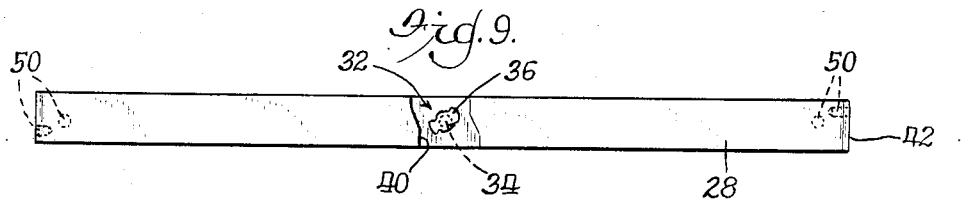
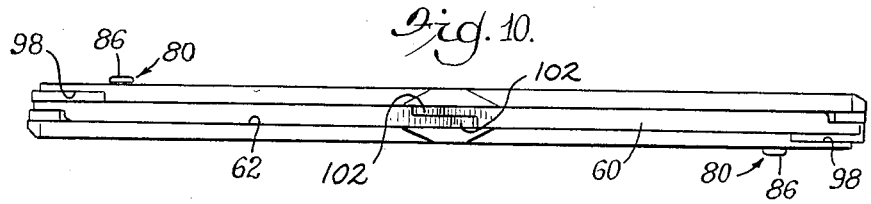

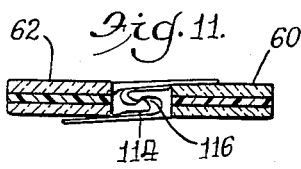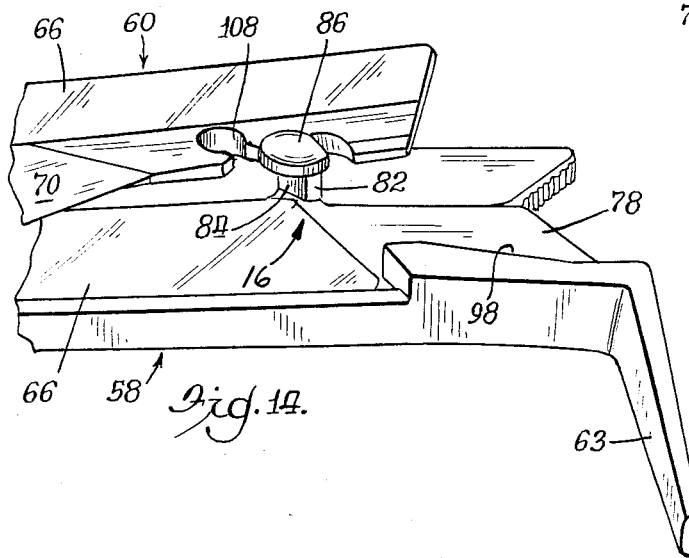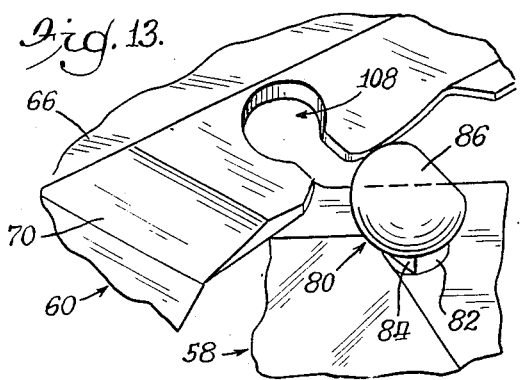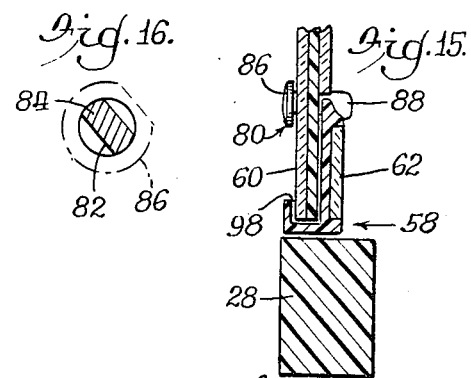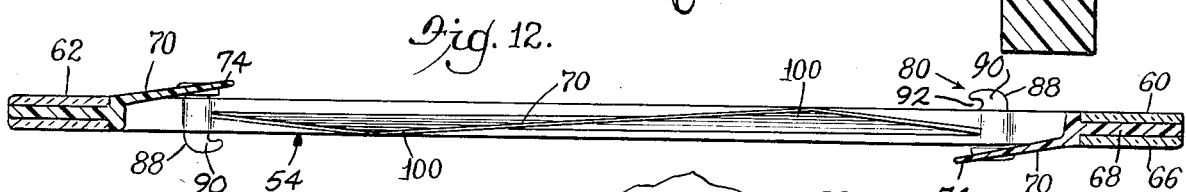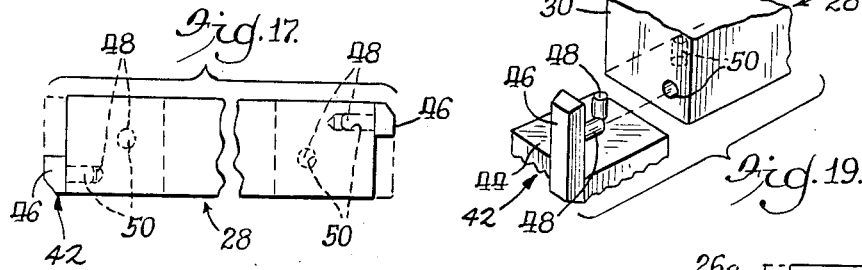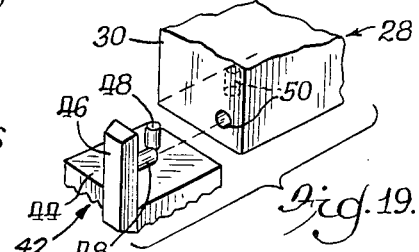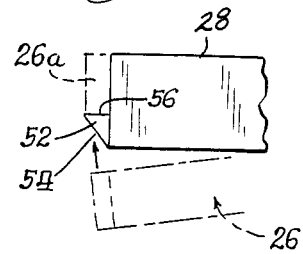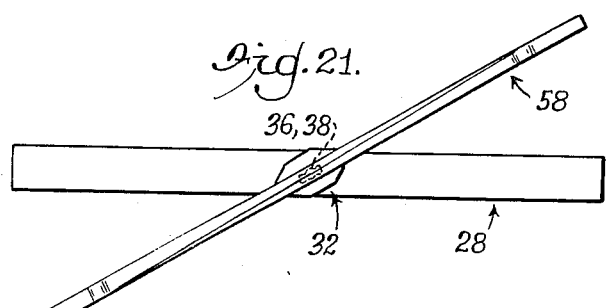

SAFETY TRIANGLE

FIELD OF THE INVENTION

The invention resides in safety triangles, required by transportation regulations to be set up at a vehicle stalled on the roadway. Among the biggest users are truckers. The triangles are made collapsible or foldable so as to occupy a minimum space when fitted away in the truck. Certain of the regulations cover size of the device, color, stability as against the wind, etc.

OBJECTS OF THE INVENTION

A broad object of the invention is to provide a safety triangle having the following features and advantages:
1. It is of special design so as to be more stable as against higher winds than in the case of previous devices, and accomplishes this advantage by the design of the elements to deflect a portion of the wind impinging on the wind side onto the lee side, in counterbalancing effect.
2. It is less expensive to manufacture than previously known devices, in that:
   a. it requires less material;
   b. it requires fewer and less expensive fabricating steps;
   c. any material that is accidentally broken in the manufacture of it, can be re-used, as contrasted with being scrapped in the manufacture of previous devices.
3. It is collapsible or foldable, and of novel construction, enabling collapsing and setting up.
4. It includes novel connecting elements in the releasable holding means that are extremely simple and strong, minimizing and virtually eliminating damage thereto in the movements between collapsed and set-up positions.
5. It includes special construction utilizing the same releasable holding means for holding the parts in both collapsed and set-up positions.
6. In addition to its foldability, the parts are separable, but the parts assume a normal folded position and in that position they cannot be separated, and in order to separate the parts, they must be forcibly moved to an abnormal position.

DESCRIPTION OF A PREFERRED EMBODIMENT

In the drawings,

FIG. 1 is a front view of the safety triangle of the invention, in set-up condition, with the base positioned perpendicular to the plane of the triangle;

FIG. 2 is a view of the device in folded or collapsed position, with the base lying in the plane of the pieces of the triangle;

FIG. 3 is a top view of FIG. 2;

FIG. 4 is an end view of FIG. 2, both ends being identical;

FIG. 5 is a face view of the parts in exploded position, the parts being oriented according to their respective positions in FIG. 2, but in separated form;

FIG. 6 is a view taken at line 6—6 of FIG. 5;

FIG. 7 is a view taken at line 7—7 of FIG. 5;

FIG. 8 is a view taken at line 8—8 of FIG. 5;

FIG. 9 is a view taken at line 9—9 of FIG. 5;

FIG. 10 is a view taken at line 10—10 of FIG. 1;

FIG. 11 is a view taken at line 11—11 of FIG. 1;

FIG. 12 is a modified view taken on the section line 12—12 of FIG. 1, and following the dot-dash arrow lines at the center of that figure;

FIG. 13 is a large-scale perspective view of elements appearing at 13 in FIG. 2;

FIG. 14 is a large-scale perspective view of elements indicated at 14 in FIG. 2 but shown at a flatter angle, from the observer's position, of FIG. 13;

FIG. 15 is a sectional view taken at line 15—15 of FIG. 1;

FIG. 16 is a sectional view of a pin, indicated by the arrow 16 in FIG. 14;

FIG. 17 is a view oriented according to FIG. 9 but showing only the end portions of the base member;

FIG. 18 is an end view from the end of FIG. 17, both ends being identical;

FIG. 19 is an exploded perspective view showing an end of the base and the stop means thereon, the latter being in separated position;

FIG. 20 is a view oriented according to FIG. 17, showing an end portion of a modified form of base;

FIG. 21 is a view oriented according to FIG. 9, showing the base and the first blade thereabove in position for separating these two elements; and FIG. 22 is a view oriented according to FIG. 2 but showing the near blade in position for mounting the latter, and having been just demounted.

The safety triangle construction disclosed herein is popularly referred to as a triangle, and this disclosure includes a triangle, as such, and a base, and for convenience the unit forming the triangle as such will be referred to herein as a triangle and that unit together with the base will be referred to as a triangle construction.

Referring in detail to the accompanying drawings, the triangle construction, constituting the device of the invention is indicated in its entirety at 24, and is shown in set-up position in FIG. 1 and includes a triangle proper, or triangle, 26 and a base 28. In set-up position the base is of course positioned transverse to the general direction of the triangle, the triangle having a two dimensional extension, the parts of which are closely adjacent a common plane.

The base 28 includes a simple elongated member or body 30, of considerable weight for stability. For mounting the triangle on the base, a bayonet slot connection 32 is provided, a pin 34 on the base having a head 36, and a slot 38 in the triangle, the base having a recess 40 to receive a limiting stop element 41 on the triangle.

The base 28 is provided at its ends with limit stops 42 for limiting swinging movement of the triangle on the base, for a purpose to be explained in detail hereinbelow. One form of limit stop is best illustrated in FIGS. 17-19 and may be made of rubber-like material and includes a main bottom portion 44 and an upright reduced width element 46. The elements 44 and 46 have pins 48 fitted in holes 50 in the base body for releasably securing the stops to the base. For the detail functioning of these limit stops, the upright element 46 is positioned adjacent one side of the base body as indicated in FIGS. 17, 18 and they are positioned for engagement by elements of the triangle, and thereby limiting swinging movement of the triangle to position it in alignment with the base, as referred to again hereinbelow. The limit stops 42 may take any of various other forms, a second one of which is shown in FIG. 20 wherein an integral extension 52 is formed on the end of the base, and has an inclined caming surface 54 and an opposite square limiting surface 56. The triangle may be moved to the position shown in FIG. 20 and moved over the stop 54 to a normal limiting position, functioning the same as described in connection with FIGS. 17–19 and as referred to again hereinbelow.

The triangle 26 is made up of separate pieces detachably fitted together, movable to an upright position shown in FIG. 1 and to a folded position, or a folded pack, shown in FIGS. 2–4. The pieces of the triangle are generally elongated and flat and for convenience are referred to as blades. These include a bottom blade 58, and two upright blades 60, 62, the upright blades being identical but arranged oppositely and in any view appear different from each other, but they are symmetrical so that the triangle appears identical from either flat side, or either side edge.

The triangle when in set-up position presents the features required by regulations, namely, an inner triangle shape 64 of orange color forming day reflecting material and a surrounding border strip 66 of red night reflecting material, forming an outer triangle but these colors or relationship therebetween as such are not of the essence of the present invention.

The bottom blade 58 is mounted directly on the base and it carries the upright blades 60, 62. For convenience in describing the device, it will be referred to as being oriented in FIGS. 1 and 2, i.e. with respect to an upright position, about an upright axis 61. The bayonet slot 38 extends longitudinally of the bottom blade, but the head 36 of the bayonet pin (FIG. 9) is disposed at a predetermined angle, relative to the longitudinal direction of the base, for prepositioning the triangle with respect to the base to enable separation thereof. The stop element 41 engages the sides of the recess 40 to limit movement of the base to the angular position of FIG. 21 in which they can be separated.

The bottom blade 58 is provided with legs 63 for balancing and stabilizing the device when in set-up position, but when it is in folded position, the legs being of a length similar to the depth of the base, are fitted against the ends of the base and against the limit stops 42. The limit stops thereby prevent swinging movement of the triangle in counter-clockwise direction (FIG. 21) but enable free swinging movement in the opposite or clockwise direction, to set-up position represented in FIG. 1. Upon removal of the limit stops 42 (FIGS. 17–19) the triangle can be swung in counter-clockwise direction, to the position shown in (FIG. 21) wherein the parts of the bayonet connection are aligned and the triangle can be separated from the base.

Referring again to the detailed construction of the triangle, each individual blade is structurally made up of a central body element 68, FIG. 12 of orange color, sandwiched between a pair of red reflector strips 66 at its outer portion, and its inner portion 70 is of shorter length and has inclined edges 72. The shorter inner portions together form the inner triangle shape 64, and in the present invention they also serve as wind deflector elements and are referred to also as vanes. For carrying out this latter function, those vanes in the upright blades are offset from the outer portions, as at 74 (FIG. 12). Referring to the bottom blade 58, FIG. 5 this blade is identical on both sides. The body element 68 thereof has end extensions 78 beyond the inner portion 70 and the corresponding reflector element, and adjacent the juncture of the inner portion with the end extensions are mounting elements 80, one at each end but oppositely directed. Each element 80 includes a pin 82 on one side of the blade, having a shank 84 (see also FIGS. 14, 16) with a head 86. The shank 84 is of noncircular shape, with flat sides (FIG. 16) for use in securing the blades together. The mounting element 80 includes a stud 88 (FIGS. 7, 8) on the opposite side of the blade in alignment with the pin. This stud is relatively short and has a hook element 90 defining a concave space 92. The studs 88 and pins 82 enable either upright blade 60, 62 to be mounted on the bottom blade on either side of the latter, and certain of the mounting elements being utilized both in folded position in which the blades are folded down on the base (FIGS. 2–4) and in upright position (FIGS. 1, 6, 7, 10, 11).

At the ends of the bottom blade, the reflector element 66 thereof extends fully to the end of the body element as indicated at 94 (FIG. 5), at one end, but at the other end it terminates short, leaving an exposed portion 96 forming in effect a recess in the blade relative to the maximum thickness thereof. At the bottom of the recess 96 is a channel 98 for receiving the end of the corresponding upright blade, in set-up position of the triangle.

The inner portion or vane 70 in the bottom blade has oppositely inclined elements 100 (FIGS. 1, 3, 7, 12) for deflecting the wind in corresponding directions, in the set-up position of the triangle, cooperating with corresponding inclined surfaces on the vanes 70 in the upright blades.

The upright blades 60, 62, as stated above, are identical but oppositely and symmetrically arranged. Reference is first made to the blade 60 which is the upright blade at the right of FIG. 1, the near blade of FIGS. 2, 3, and the middle blade of FIG. 5, and particularly this description first refers to the side exposed in FIG. 5. The blade includes the body element 68 referred to above, and the reflector element 66 terminates short at one end (the left end) leaving a recess or cavity 102 but, it extends fully to the other and lower end 104. At one end (right end FIG. 5) it is provided with a notch 108 for receiving the shank 84 of the mounting element 80 on the bottom blade, and a rib 110 which enters into the channel 98 in the bottom blade in the set-up position.

At the opposite end of the blade (left end FIG. 5) the the body element 68 is provided with serrations 112 for use in gripping it in demounting the blades from set-up position.

In the upright blades 60, 62, the vanes 70, in addition to being offset, are inclined in one direction, although straight longitudinally of the blade. This inclination as viewed from the right of FIG. 5 (see FIG. 12) is to the left, or outwardly beyond the projection of the main part of the blade. This inclination cooperates with the other elements of the blades in set-up position.

The other side of the blade is represented by the illustration of the upright blade 62 as shown in FIG. 1 and in FIG. 5. On this side of the blade, the body portion is provided with a lug 114 (see also FIG. 11) spaced from the blade proper in the direction of the thickness of the blade, providing a channel or gap 116, and the lug has a concave end surface 118 directed toward the adjacent end of the blade.

Considering first the blades as all separate, and in assembling them, a first step is represented in FIG. 22; considering the bottom blade 58 alone, and positioned as represented in FIGS. 1 and 2, the near upright blade, in this case 60, is positioned as in FIG. 2, swung downwardly from its final position, (as in FIG. 22) and the notch 108 fitted to the pin 80. This positioning of the upright blade 60 accommodates the flattened shank of the pin 82 into the notch, and then the blade is swung clockwise to a position where the lug 114 (FIG. 5) is slightly above the stud 88, and then moved downwardly to a position where the mating surfaces, i.e., the concave surfaces of the lug and stud, interengage. The distances between these various elements, longitudinally of the blade, are such that the blades fit together snugly and the concave surfaces of the stud 88 and lug 114 normally hold the upright blade down in position folded against the bottom blade.

To apply the other upright blade, 62, the exact same steps are repeated but on the other side of the bottom blade. Since the bottom blade is identical on both sides, and symmetrical, and the upright blades identical from corresponding sides, the assembly (folded as in FIG. 2) appears identical on opposite sides.

To set up the triangle, the two upright blades are snapped out of their locked or latched positions as viewed in FIGS. 2 and 3, at the corresponding ends, i.e., the near blade 60 at its left end, and the far blade 62 at the right end. Those upright blades are then moved up to the position shown in FIG. 1 and first slightly beyond that position, and the upper ends snapped over each other, on the sides opposite their positions relative to the bottom blade, whereby the sprung condition of the upright blades bias their upper ends into inter-engagement. In this position, the inclined upper end edges 72 of the upright blades fit respectively into the concave spaces 118, and the recesses 102 at the ends of the blades interfit (FIG. 10), with the thickness of the two end portions of the upright blades nearly the same as the thickness of either blade itself at a position through the reflector elements.

In the movement of the upright blades to their set-up position, the lower ends 104, beyond the pins 82, swing into the channels 98 in the bottom blade, as noted above, and this engagement between the lower ends of the upright blades and the bottom blade, limit the swinging movement of the upright blades outwardly away from each other and produce a biasing effect tending to move them toward each other and into inter-engagement, and to retain them in that engagement. Additionally the end elements at the lower ends of the upright blades engaging in the channels 98 provide a second solidifying engagement, along with the pins 82, i.e., they are spaced longitudinally therefrom, providing a 2-point mounting of the upright blades. The ribs 110 on the upright blades engage with an element of the side wall of the channel and retain the lower ends of the upright blades against the bottom blade.

It will be observed that the connection at the pins 82 and the notches 108 is utilized in both positions of the blades, namely, folded and set-up. Additionally the lugs 114 at the other ends of the upright blades are utilized in retaining the upper ends of the upright blades in inter-engagement.

The air deflecting feature of the various elements of the triangle are represented in FIG. 12, and their inclination is opposite, i.e., assuming a wind from a first direction against a face of the triangle, and as viewed in FIG. 1 the wind would be deflected from the vane on the left, which is inclined away from the observer and pass through the central opening and against the back side of the vane on the other blade 60, and the wind passing on the back side of the latter blade counteracts the effect of the wind initially blowing against it from the direction of the observer. A similar action takes place as between the vanes on the upright blades and the vane on the bottom blade, i.e., assuming the wind blowing in the same direction, it would blow against the inclined vane 70 on the left, and then on the back side of the bottom blade 58.

The bayonet connection 32 produces a snapping effect when the parts reach the set-up position of FIG. 1, whereby the user knows they have reached the proper position, and it holds them stably but releasably in that position.

This action in deflecting the wind, by applying the counteracting forces, greatly increases the stability of the device, since the normal effect of the wind of given velocity, tending to blow the device over, is not as effective in this case as in the straight flat surfaces of the previous devices.

Another result of the effect of these deflecting surfaces or vanes is that the tendency of any wind to turn or twist the triangle about the upright axis 61 is greatly reduced.

We claim:

1. A safety triangle construction comprising,
a base,
a triangle mounted on the base made up of a bottom blade and two upright blades, each blade including an outer portion of day reflecting material and an inner portion, the outer portion of each blade lying essentially in a common plane, and the inner portion of each blade forming a vane inclined from said plane and thereby operable for deflecting wind that blows generally transverse to the plane at an angle to its general direction and thereby operable for producing relative low pressures on respective sides of the triangle to counteract high pressures imposed by the wind,
the vanes of the upright blades being inclined in mutually opposite directions from said plane, and
the vane on the bottom blade having portions at opposite ends inclined mutually oppositely from said plane, and that portion at each end being inclined oppositely from the vane on the adjacent upright blade.

2. A safety triangle construction according to claim 1 wherein,
the vanes on the upright blades are straight in longitudinal direction.

3. A safety triangle construction according to claim 1 wherein,
the vanes are solid without openings therethrough.

4. A safety triangle construction comprising,
an elongated base,
a triangle made up of a bottom blade and two upright blades and means detachably mounting the upright blades on the bottom blade for movement of the upright blades between set-up and folded positions, and the blades in both positions being closely adjacent a common plane, and the upright blades moving between their said positions on axes disposed perpendicular to said plane,
said mounting means including mounting elements at each end of the bottom blade constituted by a pin on one of the blades and an open notch on the other, and those elements being arranged for preventing mounting and detaching the blades when in set-up position, and means mounting the triangle on the base for relative pivotal movement therebetween about an upright axis.

5. A safety triangle construction according to claim 4 wherein,
said mounting elements are operable also for preventing detachment of the upright blades from the bottom blade when in folded position, but the upright blades are capable of being moved downwardly beyond the bottom blade to a detaching position, and the mounting elements are operable for enabling detachment of the upright blades, when in said detaching position.

6. A safety triangle construction according to claim 4 wherein,
the bottom blade, and each upright blade has interlocking elements spaced longitudinally on the upright blades from said mounting elements, operable for stabilizing the upright blades against displacement transversely of said plane.

7. A safety triangle construction according to claim 4 wherein,
the upright blades are identical with each other, and engage the bottom blade on respectively opposite sides of the bottom blade.

8. A safety triangle construction according to claim 7 wherein,
of the mounting elements at each end of the bottom blade, the pin is carried by the bottom blade and the open notch is formed on the upright blade,
each pin includes a stud extending through to the opposite side of the bottom blade,
the upright blades include notch elements at their upper ends operable for interengaging when the blades are in set-up positions and stabilizing those blades, and operable for interengaging respective ones of said studs when the blades are in folded position and releasably retaining them in that position.

9. A safety triangle construction according to claim 8 wherein,
each blade has a main portion of predetermined thickness and thinner portions adjacent its ends forming recesses, and the respective thinner portions interengage when the blades are in set-up position, and the interengaging thin portions together form a thickness similar to that of the main portions of the blades, and wherein,
in the set-up position, the lower ends of the upright blades are on mutually opposite sides of the bottom blade, and the upper ends of the upright blades are on the sides of each other opposite the positions of their lower ends relative to the bottom blade.

10. A safety triangle construction comprising,
an elongated base,
a triangle made up of a bottom blade and two upright blades detachably mounted on the bottom blade for movement between set-up and folded positions, and the blades being closely adjacent to a common plane in both said positions,
means mounting the bottom blade, and thereby the triangle, on the base for relative rotatable movement therebetween about an upright axis at the center of the bottom blade and of the base, the base being rotatable to a folded position lying essentially in said plane, and to a supporting position lying perpendicular to said plane for supporting the triangle upright,
the bottom blade having legs at its ends of a length substantially the depth of the base and when the base is in said plane, the legs are positioned beyond and close to the end surfaces of the base, detachable limit stop members on the ends of the base engaged by said legs and thereby limiting the rotational movement of the base from said plane in the opposite direction,
the base being rotatable, upon detachment of the limit stops, in said opposite direction to an unlocking position,
said mounting means enabling detachment of the bottom blade from the base in said unlocking position but preventing detachment in all other positions.

11. A safety triangle construction according to claim 10 wherein,
said mounting means includes a pin embedded in the base and projecting thereabove, and a socket formed in the bottom blade receiving said pin, and the pin and socket have interlockable means respectively preventing and enabling detachment of the triangle from the base in the positions mentioned.

12. A safety triangle construction according to claim 11 wherein,
said pin and socket form a bayonet slot connection.

13. A safety triangle construction according to claim 11 wherein,
the limit stop members are of flexible material and have mutually transversely positioned elements engaging correspondingly positioned surfaces of the base, and
the limit stop means and the base having interfitting pin-hole formations in mutually transverse positions operable for releasably retaining the limit stop members on the base.

* * * * *